United States Patent [19]

Beguin

[11] Patent Number: 5,318,614
[45] Date of Patent: Jun. 7, 1994

[54] METHOD OF BURYING OPTICAL WAVEGUIDE PATHS

[75] Inventor: Alain M. J. Beguin, Vulaines sur Seine, France

[73] Assignee: Corning Incorporated, Corning, N.Y.

[21] Appl. No.: 976,901

[22] Filed: Nov. 16, 1992

[30] Foreign Application Priority Data

Dec. 20, 1991 [EP] European Pat. Off. ........ 91121898.0

[51] Int. Cl.$^5$ .............................................. C03C 15/00
[52] U.S. Cl. ................... 65/30.13; 65/60.51; 65/3.14; 65/117
[58] Field of Search ............ 65/30.13, 60.51, 117, 65/3.14

[56] References Cited

U.S. PATENT DOCUMENTS

| | | | |
|---|---|---|---|
| 3,711,393 | 1/1973 | Garfinkel | 204/180 |
| 3,773,488 | 11/1973 | Tran et al. | 65/30 |
| 3,836,348 | 9/1974 | Sumimoto et al. | 65/30 |
| 3,880,630 | 4/1975 | Izawa | 65/30 |
| 4,309,495 | 1/1982 | Ernsberger | 430/5 |
| 4,466,820 | 8/1984 | Clarke | 65/30.13 X |
| 4,765,702 | 8/1988 | Dohan et al. | 350/96.12 |
| 4,842,629 | 6/1989 | Clemens et al. | 65/30.13 |
| 4,913,717 | 4/1990 | Cooper | 65/30.13 |
| 4,933,262 | 6/1990 | Beguin | 430/320 |
| 4,938,836 | 7/1990 | Carenco et al. | 156/605 |
| 5,160,360 | 11/1992 | Seki | 65/30.13 |

OTHER PUBLICATIONS

R. V. Ramaswamy et al., "Ion-Exchanged Glass Waveguides: A Review", Journal of Lightwave Technology, vol. 6, No. 6, Jun. 1988, pp. 984–1002.
L. Ross "Integrated Optical Components in Substrate Glasses", vol. 62, No. 8, Glastechnische Berichte, Aug. 1989, pp. 285–297.
H. J. Lilenhof et al. "Index Profiles of Multimode Optical Strip Waveguides by Field Enhanced Ion Exchange in Glasses", Optics Communications, vol. 35, No. 1, Oct., 1980, pp. 49–53.
A. Miliou et al. "Fiber-Compatible K$^+$-Na$^+$ Ion-Exchanged Channel Waveguides: Fabrication and Characterization", IEEE Journal of Quantum Electronics, vol. 25, No. 8, Aug., 1989, pp. 1889–1897.

*Primary Examiner*—Robert L. Lindsay
*Attorney, Agent, or Firm*—W. J. Simmons, Jr.

[57] ABSTRACT

Optical waveguide paths are formed under the surface of a glass substrate by a method comprising (a) forming by ion-exchange a dopant ion path on a first substrate surface, (b) applying an electrode to the second surface, (c) contacting the first surface with a molten salt bath, and (d) applying an electrical field across the substrate to drive the dopant ions deeper into the substrate. The current resulting from high fields can overheat the substrate, thereby causing substrate warping and burying of paths to uneven depths. One aspect of the invention involves cooling the substrate by flowing the molten salt along the first surface of the substrate at a sufficient rate of flow to adequately decrease its temperature and by rapidly flowing the furnace atmosphere over the surface of the substrate. A further aspect of the invention involves initially applying a voltage $V_i$ across the substrate, allowing the current to increase to a predetermined level $I_m$, and maintaining the flow of current at the predetermined level $I_m$ by decreasing the applied voltage at a rate necessarry to maintain the current at level $I_m$. The electrical field remains for a predetermined period of time to bury the ion path a predetermined depth.

12 Claims, 3 Drawing Sheets

METHOD OF BURYING OPTICAL WAVEGUIDE PATHS

BACKGROUND OF THE INVENTION

The present invention relates to an electrical field assisted ion-exchange method of making buried waveguides.

Passive optical waveguide paths have previously been formed in the surface of a glass substrate by ion-exchange processes. Such waveguide paths are useful for integrated optical applications due to their compatibility with optical fibers and their low cost of fabrication. A first surface of a glass substrate is initially masked by depositing a layer of masking material on a surface of the substrate, and photolithographically etching the layer of masking material, leaving openings where the waveguide path is to be formed. The masked surface is contacted by a first molten salt bath. In most cases, sodium ions in the substrate glass are exchanged for a dopant cation such as Cs, Ag, Ru or Tl. An electrical field is sometimes applied during this first ion-exchange process. The waveguide path can be buried under the substrate surface by removing the mask, applying an electrode to the second surface of the substrate and contacting the active side with a second molten salt bath which contains ions that contribute less to the substrate refractive index, eg. Na and K ions. While in contact with the second salt bath, an electrical field is applied between the bath and the second surface electrode.

As a result of this double ion-exchange process, there is formed beneath the first substrate surface a signal carrying region that has a higher refractive index than the region surrounding it. It is advantageous to have fairly sharp boundaries between the higher refractive index region and its neighboring regions. Moreover, the higher refractive index region should be buried deeply enough beneath the substrate surface to prevent scattering from surface irregularities and defects. A depth greater than 15 $\mu$m is conventionally employed to prevent the electromagnetic field from reaching the surface of the glass. The refractive index profile depends on such parameters as the composition of the substrate glass, the nature of the incoming dopant ion, its concentration in the source, salt bath temperature, diffusion time, and the magnitude of the externally applied field.

The adverse effects of thermal diffusion can be reduced by burying a waveguide at a relatively low temperature. However, the processing time required to achieve a given depth correspondingly increases. An electrical field has been used to increase the rate of ion movement at low temperatures. U.S. Pat. No. 4,913,717 states that waveguides having sharp, well defined boundaries can be formed by performing the first ion-exchange at low temperature and under the influence of an electrical field of up to a few hundred volts per millimeter and burying the waveguide at a low temperature and again applying the voltage.

Although further increase in electrical field strength can decrease processing time, it can result in a number of problems: (a) it can cause arcing, (b) it can cause breakage of the glass substrate by having short circuits between the two sides of the glass substrate, these short-circuits being due to ion migration up the edges of the substrate, and (c) it can cause process instability due to Joule effect heating of the substrate.

Joule effect heating due to the application of high electrical fields can have the following effect on the process. As a high voltage is applied to the wafer, Joule effect heating of the wafer increases current flow due to the higher mobility of the ions. More power is then dissipated in the wafer, and the temperature of the wafer continues to increase. This can result in (a) a loss of control of the process due to overheating of the substrate, such overheating sometimes leading to substrate breakage, (b) a non-uniformity of waveguide characteristics (index of refraction, waveguide dimension, and depth of burial) due to the temperature gradients created, and (c) a warping of the substrate, whereby attachment of optical fibers to the waveguide paths becomes more difficult.

SUMMARY OF THE INVENTION

An object of the invention is to provide a method of burying within a glass substrate optical waveguide paths that have sharp, well defined boundaries. Another object is to provide a method of forming deeply buried waveguide paths in relatively short times. A further object is to improve the reproducibility of ion-exchange methods of forming optical waveguide paths.

The present invention relates to a method of the type employed for forming an optical waveguide path under the surface of a glass substrate having first and second opposed surfaces. After an optical waveguide path containing dopant ions is formed by ion-exchange on the first surface of the substrate, an electrode is applied to the second surface. The first surface is brought into contact with a molten salt bath, and an electrical field is applied across the substrate to drive the dopant ions deeper into the substrate. In accordance with the method of this invention, the electrical field is greater than 500 V/mm.

In an embodiment of the invention wherein the electrical field is sufficiently high that Joule effect heating of the substrate would tend to increase the substrate temperature to more than about 25° C. above the temperature of the bath, the substrate is cooled to a temperature to less than 15° C. above the temperature of the bath. The substrate cooling step can comprise flowing the molten salt along the first surface of the substrate at a sufficient rate of flow to decrease the substrate temperature to less than 15° C. above the temperature of the bath. The substrate cooling can further comprise rapidly flowing the furnace atmosphere over the surface of the substrate opposite the bath.

During the application of a voltage to the substrate, the current through the substrate can be allowed to increase to a predetermined level $I_m$, after which the flow of current is maintained at predetermined level $I_m$ by decreasing the applied voltage at a rate necessarry to maintain the current at level $I_m$. The paths can be buried to a predetermined depth by applying the electrical field for a predetermined period of time.

DESCRIPTION OF THE PREFERRED EMBODIMENTS

Examples of methods and apparatus for forming by ion-exchange an optical waveguide path in the surface of a glass substrate and the subsequent burying of that path can be found in U.S. Pat. Nos. 3,836,348; 4,765,702; 4,842,629; 4,913,717; and 4,933,262. Also see publications: R. V. Ramaswamy et al. "Ion-Exchanged Glass Waveguides: A Review", Journal of Lightwave Technology, Vol. 6, No. 6, June 1988, pp. 984-1002; H. J. Lilienhof et al. "Index Profiles of Multimode Optical Strip Waveguides by Field Enhanced Ion Exchange in Glasses", Optics Communications, Vol. 35, No. 1, October, 1980, pp. 49-53; and A. Miliou et al. "Fiber-Compatible K+-Na+ Ion-Exchanged Channel Waveguides: Fabrication and Characterization", IEEE Journal of Quantum Electronics, Vol. 25, No. 8, August, 1989, pp 1889-1897.

The first ion-exchange can be carried out as described hereinabove and as described in greater detail in the specific example set forth below. Although ions of Cs, Ag, Ru, Tl or the like can be employed for the first ion-exchange, reference will be made to thallium ions in order to simplify the discussion. After one or more waveguide paths have been formed in substrate surface 17 by the first ion-exchange process, the mask is removed and an electrode is applied to the second surface.

Figure 1:
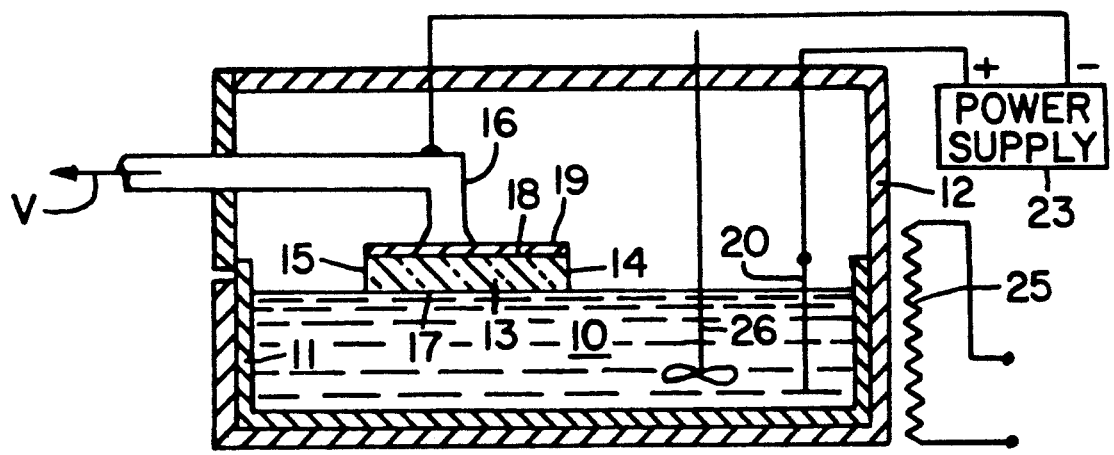
FIG. 1 is a schematic representation of a prior art salt bath system for burying optical waveguide paths within a substrate.

In the second ion-exchange apparatus shown in FIG. 1, molten salt bath 10 is held in container 11 which is kept at a constant temperature in furnace 12. Bath 10 consists of the appropriate salt as the source for the diffusing ions. Diffusion temperature is adjusted to control the rate of diffusion. Characteristics which influence the choice of a salt for a given ion are its melting point and the dissociation temperature. In some cases, melting temperatures can be lowered by using a mixture of two salts. Substrate 13 is usually a borosilicate glass containing appropriate ions for the exchange process and appropriate constituents to provide the desired refractive index. Substrate 13 can be positioned by various types of holders such as vacuum holder 16 such that first substrate surface 17 is in contact with salt bath 10. Arrow V indicates the application of vacuum to holder 16. The second substrate surface 18 is provided with a negative electrode. Although a second salt bath has usually been employed, the use of a metallic electrode 19 of gold, aluminum or the like results in a simpler apparatus. The negative terminal of power supply 23 can be connected directly to electrode 19, or it can be connected to a metallic vacuum holder 16. The positive power supply terminal is connected to a platinum wire 20 that is immersed in the molten salt. A glass tube (not shown) usually surrounds wire 20 and traps bubbles generated at that electrode. Stirrer 26 circulates that portion of the bath from the walls adjacent heater 25 to the remainder of the bath, thereby maintaining a relatively uniform temperature throughout the bath. Substrate 13 is preferably preheated in a chamber (not shown) adjacent furnace 12 prior to its entry into the furnace.

In accordance with the present invention, an electrical field greater than 500 V/mm is applied across the substrate in order to bury the surface waveguides with minimal thermal diffusion of the Tl ions and in a relatively short time. Various of the elements described below have been incorporated into the ion-exchange apparatus to enable it to withstand such high voltages.

Figure 2:
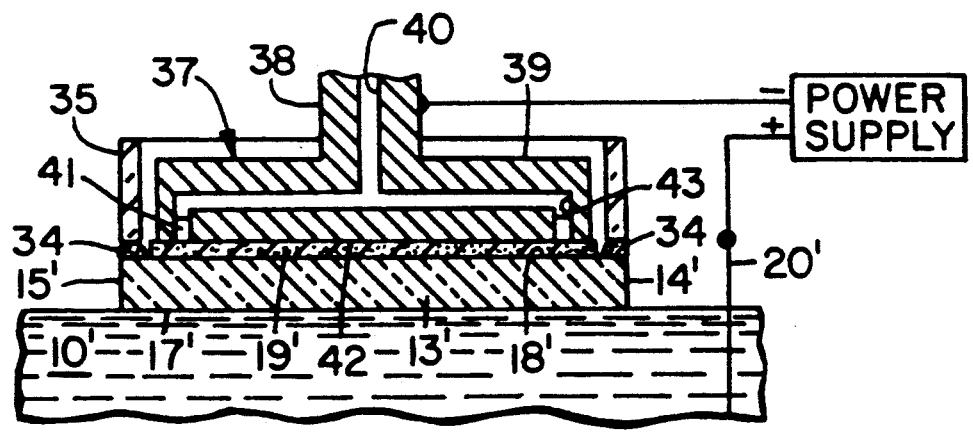
FIG. 2 is a cross-sectional view of a vacuum holder for a substrate.
Figure 4:
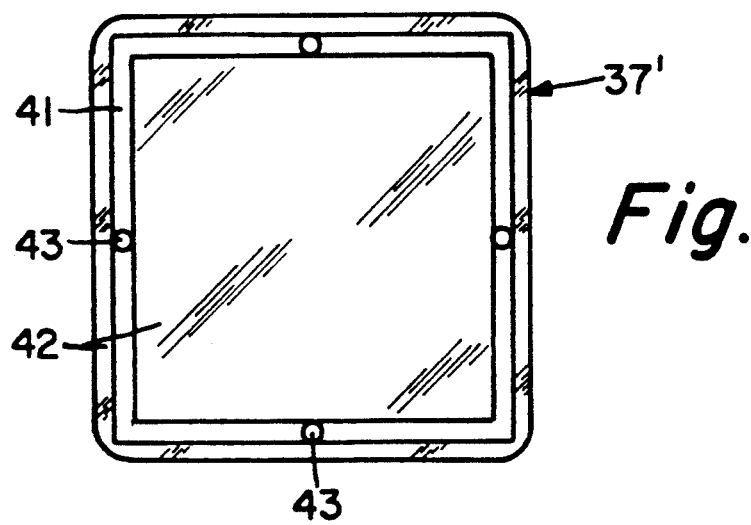
FIG. 4 is a bottom view of the vacuum holder of FIG. 2.

A preferred electrode and vacuum holder is shown in FIGS. 2 and 4, wherein elements similar to those of FIG. 1 are represented by primed reference numerals. Substrate holder 37 consists of a support arm 38 and a bottom portion 39. A manifold system including holes 40 and 43 evacuates annular groove 41 which extends around the periphery of bottom surface 42. Substrate 13' is thus secured to holder 37 with electrode 19' in very good electrical and thermal contact with bottom surface 42. Surface 42 preferably has the same general shape as the substrate, a square shape being illustrated. A round substrate would employ a round holder to allow the bottom surface of the holder to substantially cover electrode 19'. Substrate holder 37 maintains surface 17' of substrate 13' at the surface of the molten salt 10' and applies the negative power supply voltage to electrode 19'.

Figure 3:
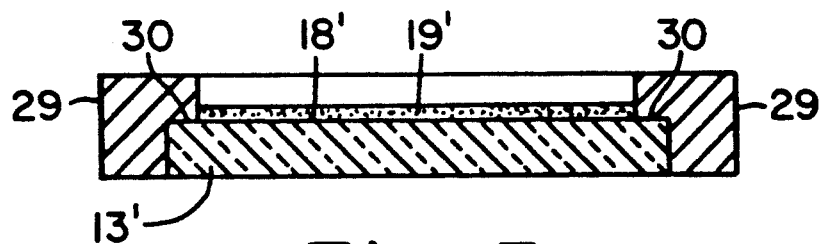
FIG. 3 is a cross-sectional view illustrating the application of a coating of carbon particles to a substrate.

Electrode 19' is preferably a porous conductive layer formed of carbon or a refractory metal such as tungsten, chromium, molybdenum, titanium or the like. The conductive material can be deposited in particle form from a spray including a volatile solvent and a polymer binder. A mask 29 (FIG. 3) can be employed to limit the deposition of electrode 19' to the desired region of the substrate surface. The deposited layer can be heated to evaporate the solvent, thus forming a layer that is itself porous or which becomes porous when heated to a temperature that is sufficiently high to cause decomposition of the binder. The porous electrode allows the ions of sodium, potassium or the like to emerge from the glass substrate without destroying the electrode.

Electrode 19' is preferably formed of porous carbon, a non-sticking material that is easily deposited and is chemically resistant to Na and K. Carbon withstands high temperatures, and it is a good electrical and thermal conductor.

A narrow bead 34 of adhesive is applied to peripheral portion 30. A ring 35 of electrically insulating material is pressed onto adhesive 34, whereby it becomes attached to the substrate. The adhesive must be able to withstand the high temperatures of the second ion-exchange step. Ring 35 can be formed of the same material as substrate 13' to eliminate the possibility of any problems due to thermal expansion mismatch. However, ring 35 can be formed of other materials having thermal expansion coefficients slightly different from that of substrate 13'.

After substrate 13' has been prepared as described above, groove 41 is evacuated, and the substrate is mounted on holder 37. The substrate has previously had a thallium-doped optical waveguide path formed in the first surface thereof by an ion-exchange process as previously described. The substrate is preheated and then inserted into the furnace where its bottom surface 17' is lowered into contact with the molten salt bath 10'. The salt bath is maintained at a relatively low temperature, i.e. one that is significantly lower than the substrate glass transition temperature $T_g$, so that the Tl ions have a sufficiently low thermal diffusion constant. The maximum salt bath temperature, which depends on the composition of the substrate glass, should be at least 30° C. below the transition temperature of the glass. The thermal diffusion constant of the Tl ions should be below $5 \times 10^{-12}$ cm$^2$/sec. In order to bury the optical waveguide path within a reasonably short time period at this low temperature, the process employs high electrical fields, i.e. fields above 500 V/mm. This causes the Tl ions to be driven deeply into the substrate; however, the thermal diffusion of these ions is sufficiently low that the optical path will not be significantly broadened, i.e. the cross-sectional dimensions of the buried path are no more than about twice the cross-sectional dimensions of the originally formed path.

As the potassium ions and/or the sodium ions reach porous electrode 19', they are reduced to their metallic form. They occupy the interstices between carbon particles, whereby they do not destroy the carbon electrode. The region of porous electrode 19' within the confines of annular ring 41 is evacuated. Since air cannot occupy the evacuated region, the Na and K occupying that region cannot be re-oxidized to form an insulating layer. Rather, the Na and K remain in metallic form, whereby an electrically and thermally conductive layer is formed. This results in the application of a uniform electrical field across the substrate, thus improving the process of burying the optical waveguide paths.

At high electrical fields and in the absence of ring 35, salts would tend to migrate up side surfaces 14' and 15' by capillary action, and the resulting coating would form a short circuit between electrode 19' and bath 10'. Such high electrical fields could also cause short circuiting directly between electrode 19' and bath 10'. Ring 35 increases the distance between electrode 19' and salt bath 10', thus preventing both types of discharges between those two conductive elements.

Figure 5:
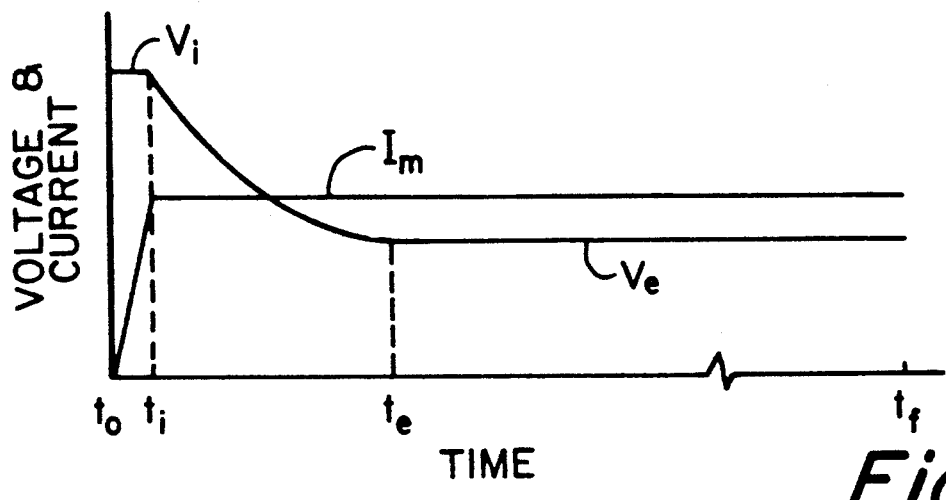
FIG. 5 is a graph illustrating the voltage applied across a substrate during the second ion-exchange process and the resultant current through the substrate.

As discussed above, Joule effect heating of the substrate due to the high electrical field could cause process instability. To prevent such instability, the electrical field is controlled by regulating the current supplied by the power supply. As voltage $V_i$ is supplied to electrodes on opposite sides of the substrate, substrate temperature begins to increase, thus causing the current through the substrate to increase. At time $t_1$, when a predetermined maximum current $I_m$ has been reached (see FIG. 5), the power supply begins to supply a constant current to the circuit including electrodes 19' and 20'. Between times $t_0$ and $t_1$, voltage remains at $V_i$. At $t_1$, the voltage begins to drop until time $t_3$, after which the voltage remains substantially constant at the equilibrium voltage $V_e$. The difference between times $t_0$ and $t_1$ can be made shorter by increasing $V_i$. By maintaining a constant current, control of the process is greatly facilitated. The number of exchanged ions is indicative of the depth to which an optical path has been buried. Controlling both current and time therefore leads to precise control of exchanged ions and thus the depth of burial of the waveguide path.

After completion of the second ion-exchange process, the substrate is cooled at a controlled rate until its temperature is sufficiently low that it can be safely brought to room temperature. Since a plurality of optical devices are conventionally formed side-by-side and/or end-to-end on the substrate, the substrate is cut into sections, each of which contains the desired number of devices. Optical fiber pigtails can be aligned with and affixed to the end of the optical waveguide paths by a technique such as that taught in U.S. Pat. No. 4,943,130.

During the second ion-exchange, the amount of heat generated by a substrate depends upon the applied electrical field, the resistivity of the substrate (which depends upon its temperature), and the area of the substrate surfaces. For example, at an applied field of about 700 V/mm, a 3 mm thick circular glass substrate having a diameter of 60 mm will attain a differential temperature of about 20° C. above the 310° C. temperature of the salt bath. For the same applied field and substrate thickness, a 75 mm square substrate will experience a differential temperature of about 26° C. above the 310° C. temperature of the salt bath. If the electrical field is further increased in order to further decrease processing time, differential temperatures will correspondingly increase.

The 20° C. differential to which a 60 mm diameter circular substrate is heated at a field of 700 V/mm is insufficient to cause substantial processing problems. A high percentage of the waveguide paths on such a substrate would be of acceptable quality. However, as indicated by the following example, excessive temperature differential, i.e. a temperature differential of at least 25° C. between the substrate and the bath, affects process stability and thus product uniformity.

Figure 6:
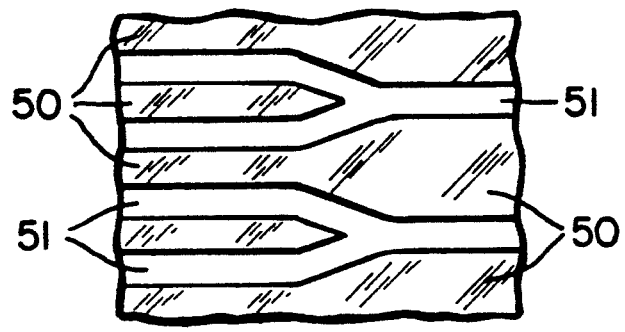
FIG. 6 is a plan view of the surface of a substrate that is masked for the first ion-exchange process.

A first ion-exchange process was employed to form thallium-doped optical waveguide paths along a first surface of a 3 mm thick square glass substrate having 75 mm sides. The substrate was formed of an alumino borosilicate glass containing sodium and potassium ions. Its refractive index was 1.463. A photolithographic technique was employed to form a silicon mask 50 on a first planar surface of the substrate. A small central portion of the masked substrate is shown in FIG. 6. Mask 50 had sixty-five parallel, Y-shaped, open paths 51, each path being 3 μm wide. The substrate was inserted into a furnace containing a thallium nitrate salt bath. The temperature of the furnace atmosphere, which was initially 200° C., was increased to 340° C. The masked surface of the substrate was then lowered into contact with the 340° C. thallium nitrate salt bath for one hour. Sixty-five Y-shaped thallium-doped optical waveguide paths were formed in the first substrate surface adjacent the mask openings by thermal diffusion. The substrate was removed from the bath to the furnace atmosphere where it was cooled to 200° C. It was then removed from the furnace and cooled to room temperature. The mask was then removed. A suitable method for applying and removing mask 50 is taught in French patent application S.N. 91 11923, filed Sep. 27, 1991.

Mask 29 (see FIG. 3) was placed over substrate 13' to cover peripheral portion 30 of second substrate surface 18'. A carbon particle coating was sprayed onto the exposed surface of the substrate from a commercially available container sold under the name Pulvegraph D 31 A manufactured by Acheson France S.A.—BP 36—La Gueroulde—27160-Breteuil-sur-Iton. The spray contained lamellar graphite in a polymeric binder and a solvent. The thickness of the carbon coating was in the range of about 12–25 μm. Mask 29 was removed, and the substrate was heated to about 100° C. to evaporate the solvent from the carbon coating. The substrate was cooled, and a thin bead of General Electric RTV 106 silicone was applied to the periphery of side 18'. A square-shaped, 15 mm high ring 35 was pressed onto the silicone bead, and the adhesive was allowed to polymerize at room temperature for at least 10 hours. The composition of ring 35 was the same as that of substrate 13′. The substrate was then affixed to holder 37 as shown in FIG. 2.

The second ion-exchange process, during which the initially formed optical waveguide paths were buried, was performed in a second ion-exchange furnace containing a molten salt bath mixture comprising 80% potassium nitrate and 20% sodium nitrate. Both the furnace atmosphere and the bath were maintained at 310° C.

The substrate was initially inserted into a heating-/cooling chamber adjacent the second ion-exchange furnace; the initial temperature of the chamber was 200° C. The chamber temperature was increased in order to raise the temperature of the substrate to 310° C. The substrate was inserted into the second ion-exchange furnace where it was lowered into contact with the 310° C. molten salt bath mixture. An electrical potential $V_i$ of 3000 V was applied between electrode 19′ and bath 10′. After 2 minutes ($t_1$), the current through the substrate had increased to a predetermined maximum value $I_m$ of 11 ma, after which time the voltage began to gradually decrease (FIG. 5) to maintain the current at a constant value of 11 ma. At 30 minutes from $t_0$, the voltage had decreased to 2100 V; it remained at that value until the end of the run, 9 hours after $t_0$. The electrical field within the substrate was therefore 700 V/mm between times $t_e$ and $t_f$. The bath had a stirrer similar to stirrer 26 of FIG. 1 which was located to one side of the substrate. The stirrer had normally been operated at a moderate speed which was sufficient to homogenize the bath at a temperature of 310° C. throughout. However, for this example, the stirrer was rotated at a high rpm, whereby the bath was vigorously stirred.

After the voltage and current reached equilibrium values (30 minutes from $t_0$), the mean substrate temperature was determined to be 336° C. Substrate temperature can be deduced by inserting a sample into a furnace with its surface in contact with the molten bath. After the sample temperature reaches equilibrium at the bath temperature, a voltage is applied, the current measured, and resistivity R is calculated. The voltage is turned off, the bath temperature is changed, a voltage is again applied, and current is again measured. This procedure is repeated a sufficient number of times within the temperature region of interest, to plot a graph of $\log_{10} R$ v. $1/T$. During any given second ion-exchange treatment, substrate temperature can be deduced by deriving resistivity from the voltage and current and then obtaining temperature from the previously generated graph of $\log_{10} R$ v. $1/T$.

After completion of the waveguide path burying process, the substrate was transferred from the second ion-exchange furnace to the heating/cooling chamber, the temperature of which was 310° C. After the substrate temperature had decreased to 200° C., the substrate was removed from the chamber.

Figure 7:
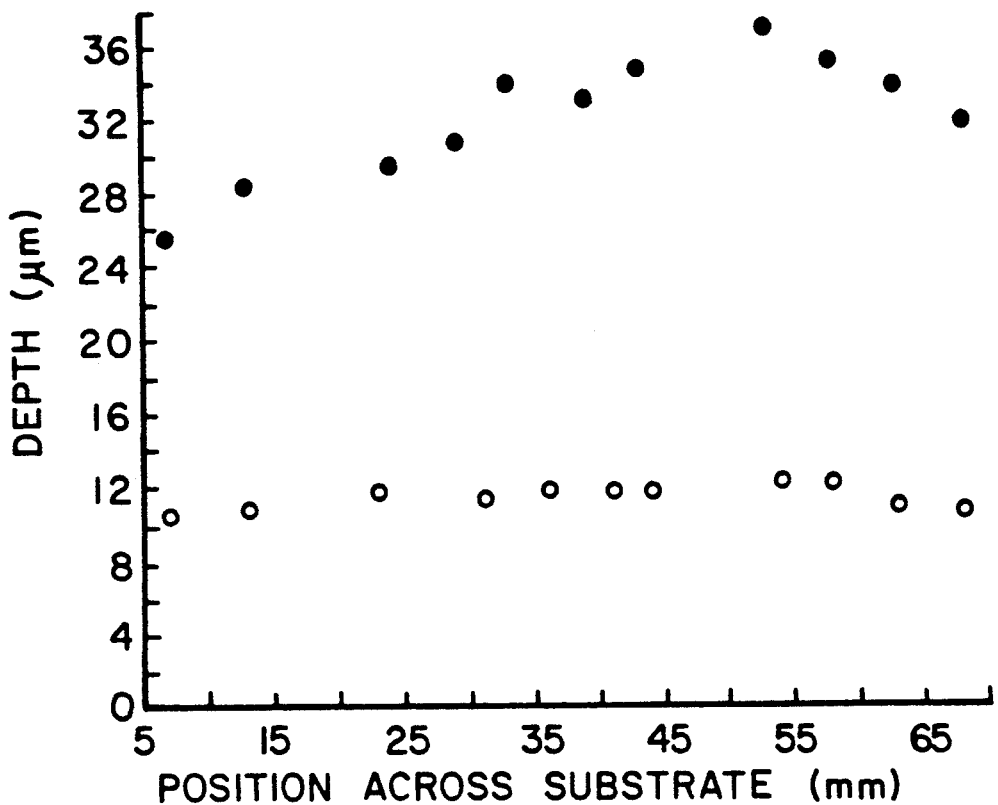
FIG. 7 is a graph illustrating different depths to which waveguide paths can be buried as a result of the uneven heating of the substrate.
Figure 8:
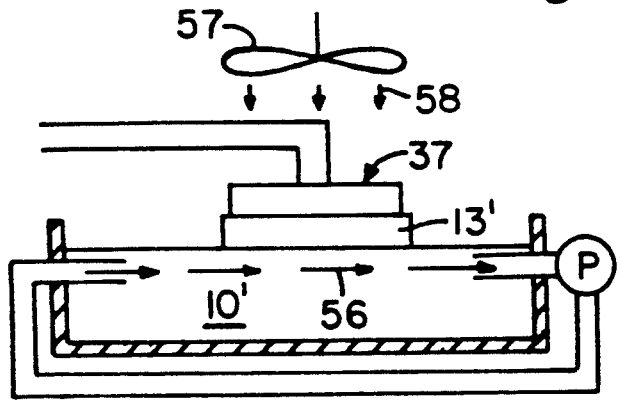
FIGS. 8-11 schematically illustrate various techniques for cooling a substrate during the second ion-exchange step.

The second ion-exchange treatment caused the Tl ions to be driven deeply into the substrate. However, the 26° C. average temperature differential between the substrate and the bath caused a temperature gradient to exist within substrate 13′. Since end 14′ was near the stirrer, it was cooled by the bath that flowed rapidly past that end. End 15′ was more remote from the stirrer; the less rapid flow past that end was unable to cool it to the extent to which end 14′ was cooled. Therefore, the temperature of end 14′ was nearer to the bath temperature than end 15′. The optical waveguide paths ran along the substrate from end 14′ to end 15′. A section 5 μm long was severed from ends 14′ and 15′ to reveal the waveguide paths. The depth of each waveguide path was determined by launching light into one end and focusing a microscope objective onto the output of the guide. The image of the substrate surface and of the waveguide was made on a video camera and the depth of the waveguide was measured on a cathode ray tube after calibration. FIG. 7 shows the depths of waveguide paths at each end. The open circles represent the depths of selected paths at end 14′, and the closed circles represent the depths of selected paths at end 15′. It can be seen that the paths located at the cooler end of the substrate were buried to depths of between 11 and 12 μm. The paths at the warmer end of the substrate were buried at depths of about 26 μm to 37 μm. The uniformity of burial depth at end 14′ suggests that substantial uniformity of burial depth both along the paths and from path-to-path can be obtained by flowing molten bath along the substrate surface at a rate sufficiently great to cool the substrate such that the temperature differential between bath and substrate is no more than about 15° C.

Techniques for rapidly circulating molten bath are illustrated in FIGS. 8–11. Pump P of FIG. 8 discharges molten bath material at one side of substrate 13′ and withdraws molten bath material from the opposite side of the substrate. Arrows 56 represent the flow of molten salt along the bottom of the substrate. Means such as a fan blade 57 can circulate the furnace atmosphere (arrows 58) onto the top of substrate 13′ to assist in the cooling of the substrate.

Figure 11:
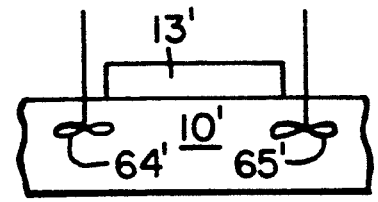
Figure 9:
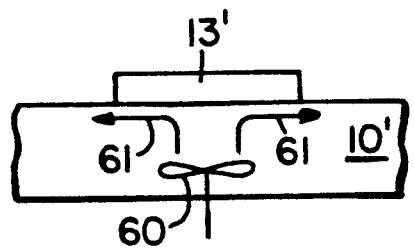
Figure 10:
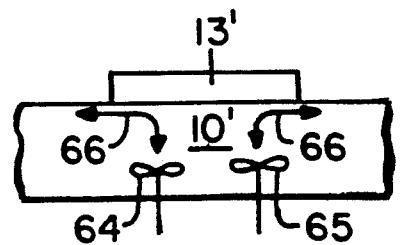

Stirring blade 60 of FIG. 9, which is located below the substrate, directs molten bath onto the substrate or withdraws molten bath from the substrate as indicated by double-headed arrows 61. FIG. 10 shows that a plurality of stirring blades 64 and 65 can cause the flow of bath material to or from the substrate. If a plurality of blades are employed, one or more can direct molten bath material toward one portion of the substrate and one or more can direct molten bath material away from another portion of the substrate. FIG. 11, which is similar to FIG. 10, illustrates that the stirring blade shafts can extend into bath 10′ from the top of the furnace.

I claim:

1. A method for forming an optical waveguide path under the surface of a glass substrate having first and second opposed surfaces, the method comprising:
    forming an optical waveguide path on said first surface of said substrate by ion-exchange;
    applying an electrode to said second surface;
    contacting said first surface with a molten salt bath;
    applying an electrical field across said substrate to drive the first ions deeper into said substrate, said electrical field being greater than 500 V/mm; and, when the temperature of the substrate becomes elevated, because of the current flow through the substrate, to an extent that the optical paths would not have substantially uniform widths or burial depths, then cooling the substrate, while said current is flowing, so that the optical path widths or burial depths are substantially uniform.

2. A method in accordance with claim 1 wherein the electrical field is at least 700 V/mm whereby Joule effect heating of said substrate would tend to increase the substrate temperature to more than about 25° C. above the temperature of said bath, said method comprising the step of cooling said substrate to a temperature to less than 15° C. above the temperature of said bath.

3. A method in accordance with claim 2 wherein the step of cooling said substrate comprises flowing said molten salt along the first surface of said substrate at a sufficient rate of flow to decrease said substrate temperature to less than 15° C. above the temperature of said bath.

4. A method in accordance with claim 3 wherein the step of flowing comprises pumping molten salt from a first end of said substrate and delivering molten salt to the end of said substrate opposite said first end.

5. A method in accordance with claim 3 wherein the step of flowing comprises operating flow inducing means within said bath adjacent said substrate to cause a rapid flow of molten salt over the surface of said substrate.

6. A method in accordance with claim 3 wherein said salt bath is located in a furnace in which a furnace atmosphere is disposed above said bath, the step of cooling said substrate further comprising rapidly flowing the furnace atmosphere over the surface of said substrate.

7. A method in accordance with any of the preceding claims wherein the step of applying a voltage across said substrate causes Joule effect heating of said substrate whereby the current through said substrate increases, said method further comprising the step of allowing the current to increase to a predetermined level $I_m$, maintaining the flow of current at said predetermined level $I_m$ by decreasing said applied voltage at a rate necessarry to maintain said current at level $I_m$.

8. A method in accordance with claim 7 wherein the step of applying an electrical field is continued for a predetermined period of time.

9. A method in accordance with claim 1 wherein the electrical field is sufficiently great that Joule effect heating of said substrate would tend to increase the substrate temperature to more than about 25° C. above the temperature of said bath, said method comprising the step of cooling said substrate to a temperature to less than 15° C. above the temperature of said bath.

10. A method in accordance with claim 9 wherein the step of cooling said substrate comprises flowing said molten salt along the first surface of said substrate at a sufficient rate of flow to decrease said substrate temperature to less than 15° C. above the temperature of said bath.

11. A method for forming an optical waveguide path under the surface of a glass substrate having first and second opposed surfaces, the method comprising forming an optical waveguide path on said first surface of said substrate by ion-exchange, applying an electrode to said second surface, contacting said first surface with a molten salt bath, and applying an electrical field across said substrate to drive the first ions deeper into said substrate the electrical field being greater than 500 V/mm and sufficiently great that Joule effect heating of said substrate would tend to increase the substrate temperature to more than about 25° C. above the temperature of said bath, and cooling said substrate to a temperature to less than 15° C. above the temperature of said bath.

12. A method in accordance with claim 11 wherein the step of cooling said substrate comprises flowing said molten salt along the first surface of said substrate at a sufficient rate of flow to decrease said substrate temperature to less than 15° C. above the temperature of said bath.

* * * * *